United States Patent
Sahara

(10) Patent No.: US 9,363,401 B2
(45) Date of Patent: Jun. 7, 2016

(54) IMAGE READING APPARATUS FOR REDUCING START-UP TIME

(71) Applicant: Shinya Sahara, Nagoya (JP)

(72) Inventor: Shinya Sahara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/151,939

(22) Filed: Jan. 10, 2014

(65) Prior Publication Data

US 2014/0198358 A1  Jul. 17, 2014

(30) Foreign Application Priority Data

Jan. 11, 2013 (JP) ................. 2013-003726

(51) Int. Cl.
*H04N 1/12* (2006.01)
*H04N 1/00* (2006.01)

(52) U.S. Cl.
CPC ......... *H04N 1/00891* (2013.01); *H04N 1/0057* (2013.01)

(58) Field of Classification Search
None
See application file for complete search history.

(56) References Cited

U.S. PATENT DOCUMENTS

| | | | |
|---|---|---|---|
| 5,344,134 A | 9/1994 | Saeki et al. | |
| 5,682,252 A * | 10/1997 | Ando | 358/461 |
| 6,571,189 B2 * | 5/2003 | Jensen et al. | 702/104 |
| 6,771,397 B2 * | 8/2004 | Hashizume | 358/474 |
| 7,355,761 B2 | 4/2008 | Yang | |
| 7,466,461 B2 * | 12/2008 | Chen et al. | 358/474 |
| 7,605,956 B2 | 10/2009 | Lee | |
| 7,694,963 B2 * | 4/2010 | Iwago et al. | 271/258.01 |
| 7,769,322 B2 | 8/2010 | Ishihara et al. | |
| 8,253,986 B2 * | 8/2012 | Ikeno | H04N 1/1017 358/461 |
| 8,477,391 B2 * | 7/2013 | Shimmachi | H04N 1/0057 358/1.14 |
| 8,559,072 B2 * | 10/2013 | Takeuchi | H04N 1/02815 358/474 |
| 2003/0234965 A1 | 12/2003 | Yang | |
| 2010/0195167 A1 * | 8/2010 | Yokochi | H04N 1/00002 358/475 |
| 2012/0161382 A1 | 6/2012 | Morinaga et al. | |
| 2014/0092453 A1 | 4/2014 | Ishikawa | |

FOREIGN PATENT DOCUMENTS

JP  2006-086817 A  3/2006

OTHER PUBLICATIONS

Co-pending U.S. Appl. No. 14/163,492, filed Jan. 24, 2014.
Aug. 14, 2007—(US) Notice of Allowance—U.S. Appl. No. 14/163,492.

* cited by examiner

*Primary Examiner* — Paul F Payer
(74) *Attorney, Agent, or Firm* — Banner & Witcoff, Ltd.

(57) ABSTRACT

An image reading apparatus includes a conveyance unit, a reading unit, a carriage, a motor, a motor gear, a conveyance gear, a carriage gear, and a control device. The conveyance unit is configured to convey a document. The reading unit is configured to read an image on the document. The carriage is configured to support the reading unit and to be movable in a prescribed direction. The reading unit is selectively operable in a first mode in which the image on the document is read while conveying the document by the conveyance unit, and a second mode in which the image on the document is read by moving the reading unit in the prescribed direction. The switching gear is configured to be placed in a first position and a second position. The control device is configured to control the switching gear to move between the first position and the second position, acquire initialization data initializing the reading unit, and control the reading unit to read the image on the document. The control device acquires the initialization data while controlling the switching gear to move between the first position and the second position.

10 Claims, 10 Drawing Sheets

IMAGE READING APPARATUS FOR REDUCING START-UP TIME

CROSS REFERENCE TO RELATED APPLICATION

This application claims priority from Japanese Patent Application No. 2013-003726 filed on Jan. 11, 2013. The entire content of the priority application is incorporated herein by reference.

TECHNICAL FIELD

The present invention relates to an image reading apparatus.

BACKGROUND

An image reading apparatus described in Japanese Patent Application Publication No. 2006-86817 is well-known in the art. The conventional image reading apparatus includes a reading unit such as a CIS for reading a document, a conveyance unit for conveying a document to the reading unit, a carriage for moving the reading unit, a single motor for driving the moving unit and the conveyance unit, and a switching gear serving as a transmission unit for transmitting drive power of the motor. The switching gear switches its position between a conveyance position at which the transmission unit transmits the power to the conveyance unit and a carriage position at which the transmission unit transmits the power to the moving unit, whereby the conveyance unit and the moving unit can be driven by a single motor.

SUMMARY

The image reading apparatus executes upon activation the switching process for switching the position of the switching gear between the conveyance position and the carriage position, and acquisition process for acquiring initialization data required to initialize the reading unit. However, if the image reading apparatus separately performs the switching process and the acquisition process, a longer start-up time is disadvantageously required to start reading process for reading a document image. That is, the image reading apparatus performs the switching process after the acquisition process is ended, requiring the longer start-up time.

In view of the foregoing, it is an object of the present invention to provide an image reading apparatus capable of reducing a start-up time required to start the reading process in a configuration in which the position of the switching gear is switched between the conveyance position and the carriage position even if the acquisition process for acquiring the initialization data is performed.

In order to attain the above and other objects, the invention provides an image reading apparatus. The image reading apparatus includes a conveyance unit, a reading unit, a carriage, a motor, a motor gear, a conveyance gear, a carriage gear, a switching gear, and a control device. The conveyance unit is configured to convey a document. The reading unit is configured to read an image on the document. The carriage is configured to support the reading unit and to be movable in a prescribed direction. The reading unit is selectively operable in a first mode in which the image on the document is read while conveying the document by the conveyance unit, and a second mode in which the image on the document is read by moving the reading unit in the prescribed direction. The motor gear is configured to transmit a drive power generated by the motor. The conveyance gear is configured to transmit the drive power to the conveyance unit in the first mode. The carriage gear is configured to transmit the drive power to the carriage in the second mode. The switching gear is configured to be placed in a first position, when the reading unit operates the first mode, where the motor gear is connected to the conveyance gear via the switching gear, and be placed in a second position, when the reading unit operates in the second mode, where the motor gear is connected to the carriage gear via the switching gear. The control device is configured to control the switching gear to move between the first position and the second position, acquire initialization data initializing the reading unit; and control the reading unit to read the image on the document. The control device acquires the initialization data while controlling the switching gear to move between the first position and the second position.

BRIEF DESCRIPTION OF THE DRAWINGS

The particular features and advantages of the invention as well as other objects will become apparent from the following description taken in connection with the accompanying drawings, in which.

DETAILED DESCRIPTION

An embodiment of the present invention will be described with reference to FIGS. 1 to 10.

1. External Configuration of Image Reading Apparatus

Figure 1:
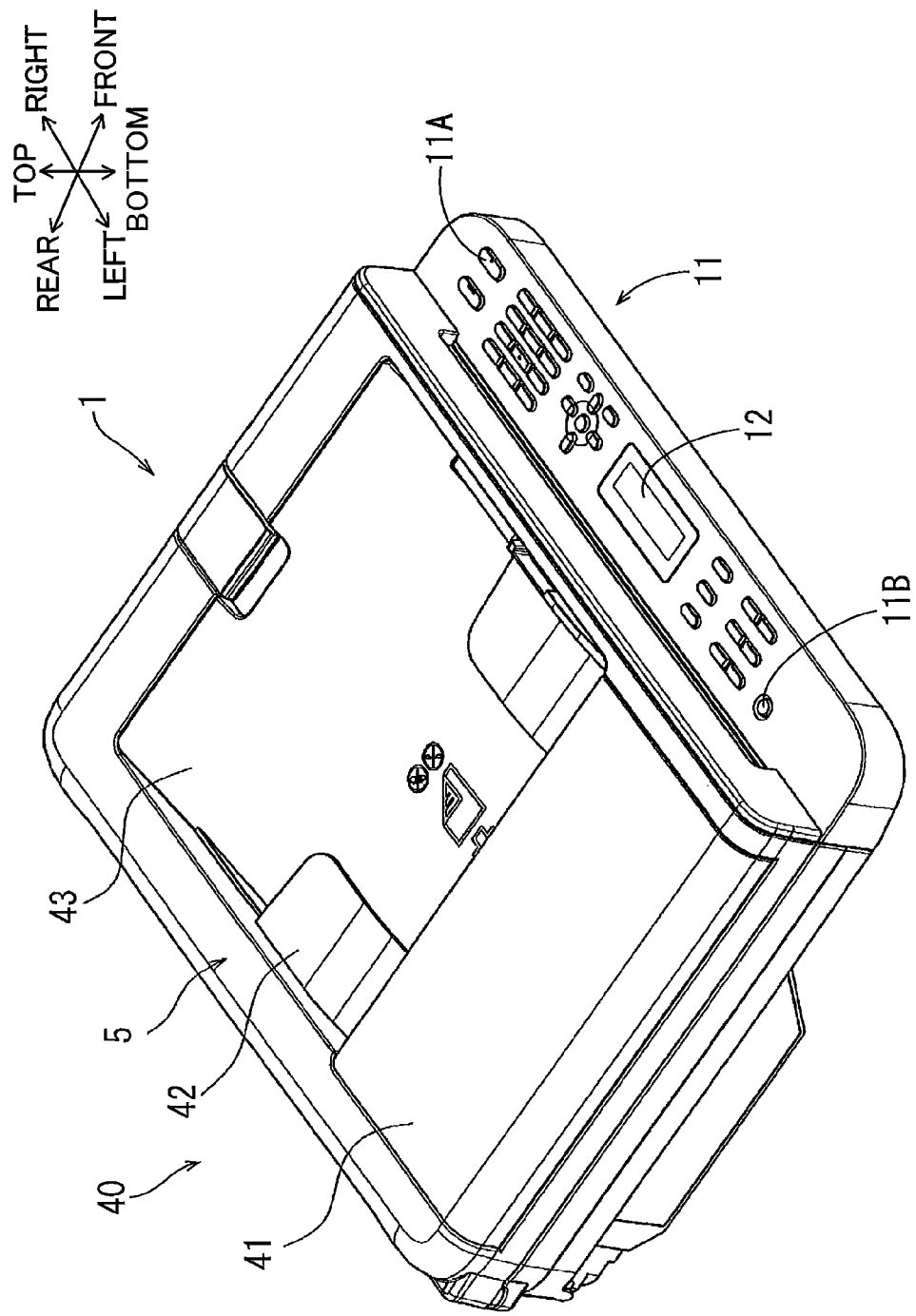
FIG. 1 is a schematic perspective view of an image reading apparatus in a state where a document cover is closed according to a preferred embodiment of the present invention.
Figure 3:
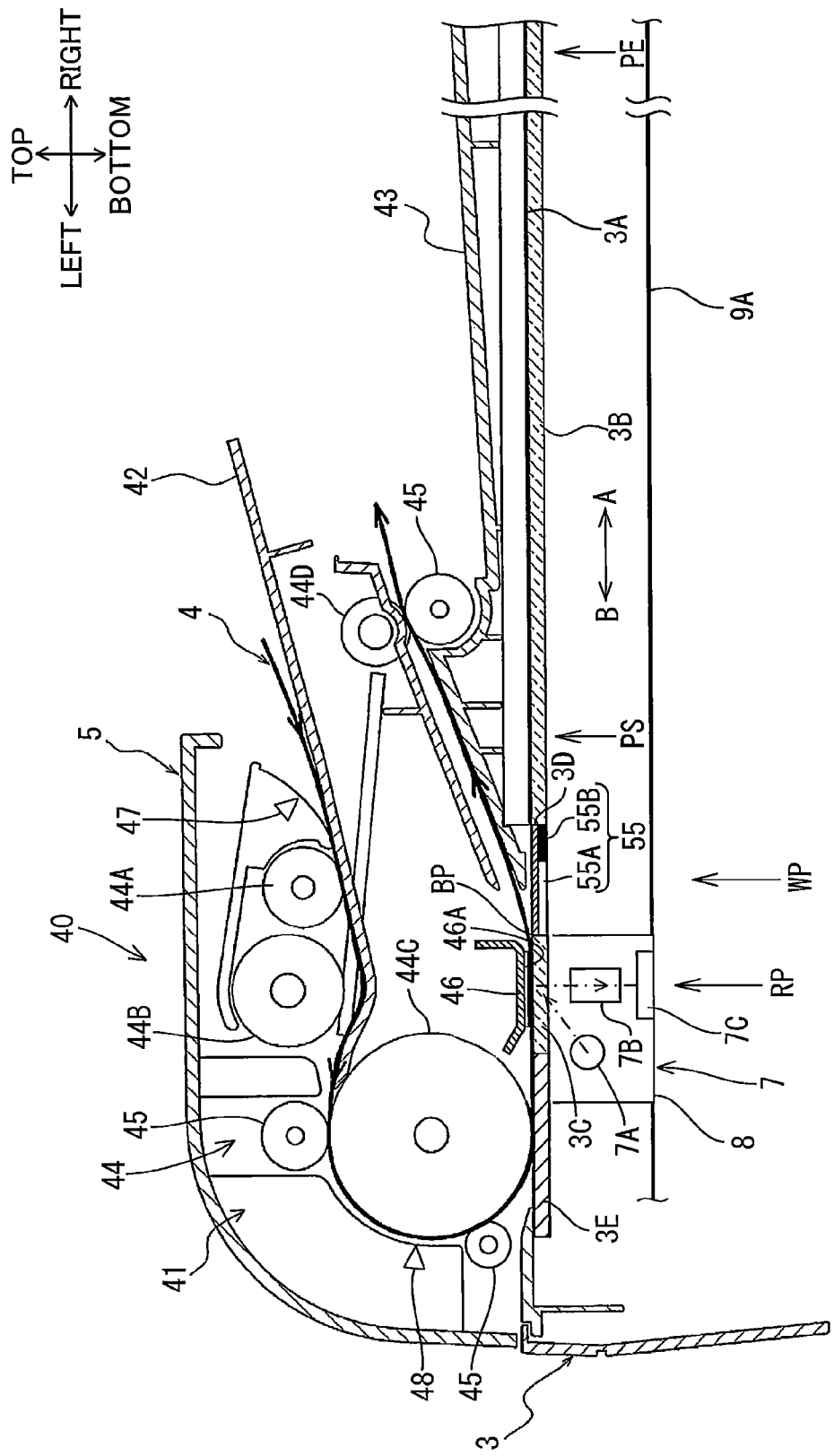
FIG. 3 is an enlarged schematic cross-sectional view of the image reading apparatus according to the preferred embodiment of the present invention.

As shown in FIG. 3 and the like, an image reading apparatus 1 includes a reading unit 7, a carriage 8, a moving mechanism 9 for conveying the carriage 8, an Auto Document Feeder 40 (hereinafter abbreviated to "ADF"), and a document platen 3. As shown in FIG. 1, the image reading apparatus 1 has a front side portion provided with an operation unit 11 having a read start key 11A and a power key 11B, and a display unit 12 such as a liquid crystal display.

The image reading apparatus 1 has, as an image reading mode, a carriage-moving mode (hereinafter, referred to as "FB (Flat-Bed) reading mode") in which the reading unit 7 reads an image of a document conveyed by the carriage 8 and a sheet-conveying mode (hereinafter, referred to as "ADF reading mode") in which the reading unit 7 reads an image of a document conveyed by a conveyance unit 44 (see FIG. 3) of the ADF 40. The image reading apparatus 1 may be a stand-alone scanner or copier, or a part of so-called a multifunctional device having printer and facsimile functions.

Figure 2:
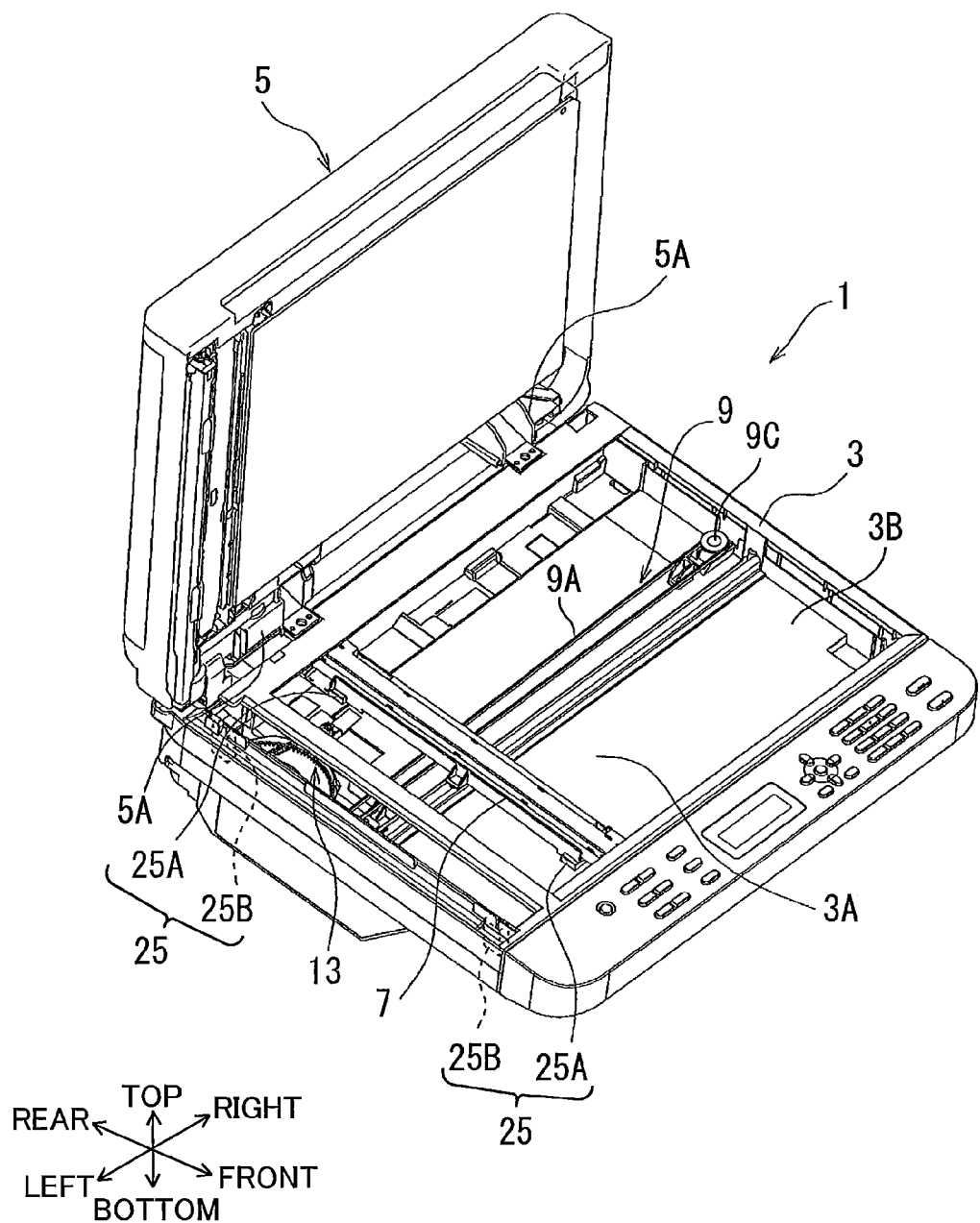
FIG. 2 is a schematic perspective view of the image reading apparatus in a state where the document cover is open according to the preferred embodiment of the present invention.

As shown in FIG. 2, the document platen 3 has a platen 3B such as a glass or acrylic transparent as a first reading window. The platen 3B defines a placement surface 3A on which a document is placed. A document cover (example of a cover) 5 is assembled immediately above the document platen 3 via a hinge mechanism 5A.

The document cover 5 is pivotally movable between a closed position (FIG. 1) covering the document platen 3 and a remote position (FIG. 2) away from the document platen 3. In the FB reading mode, a user needs to manually move the document cover 5 upward and place a document on the placement surface 3A.

As shown in FIG. 2, the image reading apparatus 1 further includes a drive transmission mechanism 13 and a load generation unit 25. The load generation unit 25 includes a pair of first contacted portions 25A provided in the reading unit 7 and a pair of first stoppers 25B provided in the document platen 3 each corresponding to the pair of first contacted portions 25A.

The reading unit 7 moving along the placement surface 3A is provided immediately below the placement surface 3A (see FIG. 3). The reading unit 7 emits the light to a document and receives emitted light reflected from the document and generates an electric signal based on the received light. The image reading apparatus 1 converts characters and the like written on the document into the electric signal generated in the reading unit 7.

The reading unit 7 is adapted to read the document with a CIS (Contact Image Sensor) system. The reading unit 7 includes a linear image sensor 7C having a plurality of light receiving elements, a light source 7A constituted by RGB three-color light emitting diodes (LEDs), and a rod lens array 7B that focuses light reflected from the document onto the light receiving elements of the linear image sensor 7C, and those are linearly arranged in a direction perpendicular to a paper surface, i.e. front-to-rear direction.

The carriage 8 for supporting the reading unit 7 is coupled to a toothed belt 9A described later and moves in a conveyance direction, i.e., an arrow A and arrow B as depicted in FIG. 3, with movement of the toothed belt 9A. The toothed belt 9A is driven by a drive power transmission mechanism to be described later through a toothed pulley 9B (see FIG. 4). The image reading system of the reading unit 7 is not limited to the CIS system, and the reading unit 7 may adopt so-called a CCD system using an optical reduction system and a CCD (Charge-Coupled Device) image sensor.

When reading the document placed on the platen 3B, that is, in the FB reading mode, the reading unit 7 reads the document while being conveyed, at a constant speed, by the carriage 8 coupled to the toothed belt 9A in the conveyance direction (direction of the arrow A of FIG. 3) parallel to a plate surface of the platen 3B from a waiting position WP. The reading unit 7 can read the document within a read range in the conveyance direction defined between a read start position PS and a read end position PE (see FIG. 3). In the present embodiment, the read start position PS is fixed irrespective of a read range of the document, and the read end position PE is changed according to the read range of the document.

On the other hand, when reading the document conveyed by the ADF 40, that is, in the ADF reading mode, the image reading unit 7 reads the document while being retained, by the carriage 8, at a conveyance reading position (hereinafter, referred to as "ADF reading position") RP immediately below a second reading window 3C.

As shown in FIG. 3, a document pressing member 46 is provided at a position immediately above the second reading window 3C, i.e., at a position opposite to the reading unit 7 positioned at the ADF reading position RP with respect to the second reading window 3C. The document pressing member 46 is adapted to push the document during the ADF reading mode. The reading unit 7 is positioned at the ADF reading position RP and reads the document pressing member 46 in the absence of the document. In the present embodiment, the document pressing member 46 has a confronting surface in confrontation with reading unit 7 and provided with a white reference board (example of reading white board) 46A.

The moving mechanism 9 illustrated in FIG. 2 includes a first and second toothed pulleys 9B (see FIG. 4) and 9C which are fixed to the document platen 3 and the toothed belt 9A looped around the first and second toothed pulleys 9B and 9C. The toothed belt 9A moves upon the rotation of the first toothed pulley 9B. The carriage 8 is connected to the toothed belt 9A, thereby moving depending on a moving direction of the toothed belt 9A.

The second reading window 3C (example of a transparent member) is also closed by a transparent platen such as a glass similarly to the first reading window, i.e., placement surface 3A. As shown in FIG. 3, the placement surface 3A and the second reading window 3C are separated by a beam-like partitioning member 3D, and the second reading window 3C is provided between the partitioning member 3D and a left end portion 3E of the document platen 3.

As shown in FIG. 3, the partitioning member 3D has an adjustment reference board 55. The adjustment reference board 55 is provided for readjusting reference of color and shading at a reading process for reading the document by the reading unit 7 and a reference position of the reading unit 7.

The adjustment reference board 55 includes a white tape 55A and a black tape 55B arranged in a sub-scan direction (left-right direction of FIG. 3). In the present embodiment, the waiting position WP is a position corresponding to the white tape 55A in the left-right direction of FIG. 3. The waiting position WP is a position where the reading unit 7 stays during a non-execution of the reading mode. Further, the waiting position WP is a reference position for the reading unit 7 to perform scanning operation. Further, when the reading unit 7 stays at the waiting position WP and reads the white tape 55A, the reading unit 7 can acquire white data used for correction of light amount adjustment data of the light source 7A and a read data created in the reading process.

As shown in FIG. 3, the white tape 55A (example of moving white board) is provided on a moving path along which the carriage 8 is moved from the waiting position WP to the ADF reading position RP. Specifically, the white tape 55A is located at a position on an upstream of the second reading window 3C in the moving path so as to contact a left edge BP of the second reading window 3C. Further, the white tape 55A is provided at the same side as a surface of the second reading window 3C in contact with the document (that is, in FIG. 3, a lower surface of the second reading window 3C). A width of the white tape 55A, that is, a length of the white tape 55A in the conveyance direction is not limited to that illustrated in FIG. 3. For example, an end portion of the white tape 55A may be away from the edge BP of the second reading window 3C.

As shown in FIG. 3, the document cover 5 is provided with the ADF 40. The ADF 40 includes a conveyance path 4, an ADF cover 41, a document tray 42, a supply roller 44A, conveyor rollers 44B and 44C, a discharge roller 44D, and a discharge tray 43 utilizing a top surface of the document cover 5. Further, a plurality of driven rollers 45 is provided opposite to the conveyor roller 44C and the discharge roller 44D.

Further provided are a front sensor 47, such as a photosensor, for detecting the document set on the document tray 42 and a rear sensor (example of a document sensor) 48, such as a photosensor, for detecting the document to be conveyed by the conveyor rollers 44B and 44C.

In the conveyance path 4, the rear sensor 48 is provided on an upstream of the reading unit 7 in a document conveyance direction. The supply roller 44A, the conveyor rollers 44B, 44C, and the discharge roller 44D each correspond to an example of a conveyance unit 44 for conveying the document. In the ADF 40, the conveyance unit 44 conveys the documents set on the document tray 42 one by one and discharges the conveyed document to the discharge tray 43.

2. Drive Power Transmission Mechanism 2-1. Configuration of Drive Power Transmission Mechanism In the present embodiment, the moving mechanism 9 and the conveyance unit 44 are driven by a single motor 31. That is, the drive transmission mechanism 13 selectively transmits drive power, i.e., a motor torque, generated in the motor 31 to the moving mechanism 9 and the conveyance unit 44.

Figure 4:
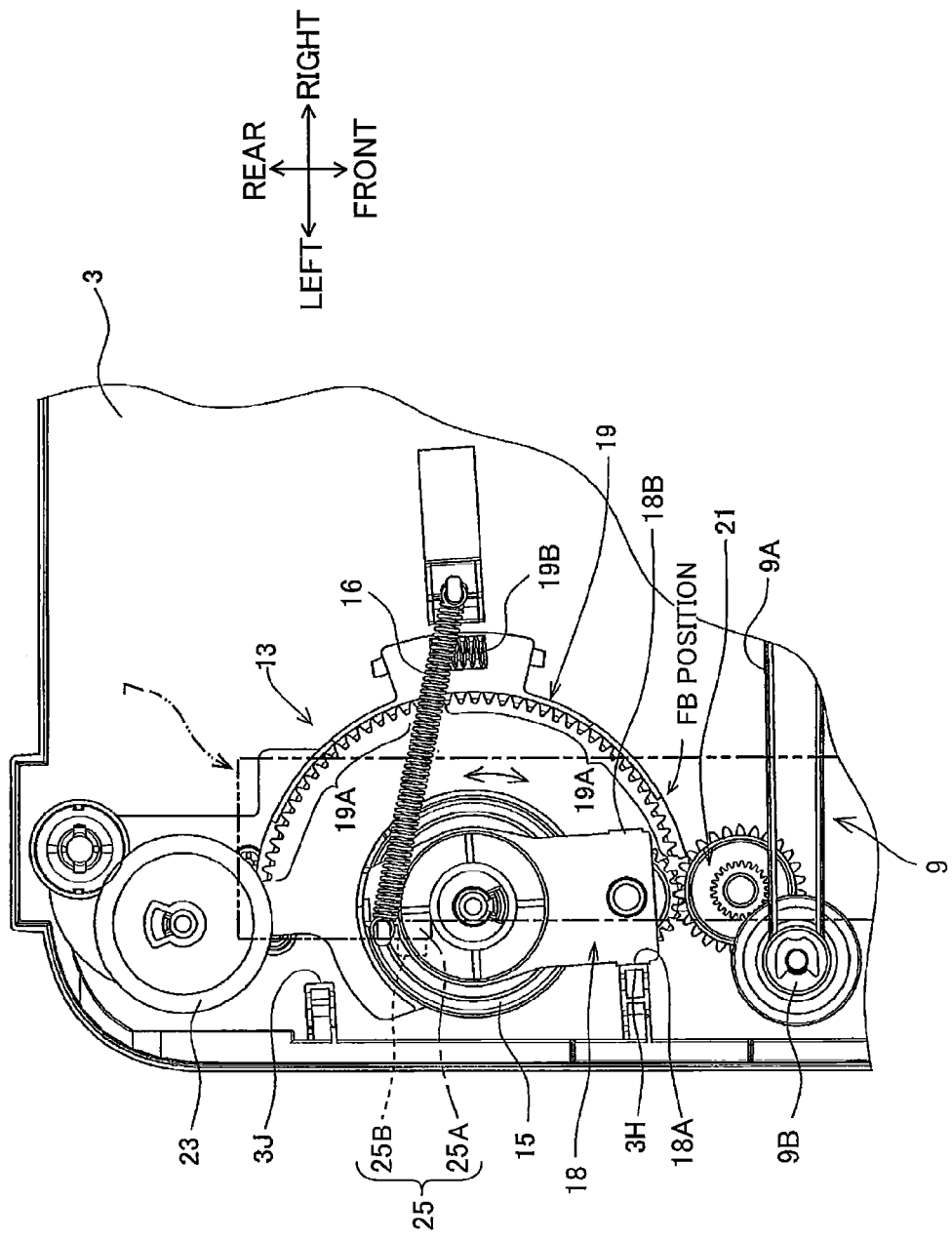
FIG. 4 is a schematic view of a drive transmission mechanism of the image reading apparatus in a state where a planetary gear is positioned at a carriage position according to the preferred embodiment of the present invention.

As shown in FIG. 4, the drive transmission mechanism 13 according to the present embodiment includes: a planetary gear mechanism having a sun gear (example of a motor gear) 15, a planetary gear (example of a switching gear) 17, and an engagement portion 19; a carriage gear (hereinafter, referred to as "FB side transmission gear") 21; and a conveyance gear (hereinafter, referred to as "ADF side transmission gear") 23.

The sun gear 15 transmits the power supplied from the motor 31 (see FIG. 6) to the planetary gear 17 and rotates without a displacement relative to the platen 3. The sun gear 15 rotates by obtaining drive power from the motor 31. In the present embodiment, a rotation direction of the motor 31 and that of the sun gear 15 coincide with each other, and thus the sun gear 15 rotates in a normal rotation direction and a reverse rotation direction in accordance with the rotation direction of the motor 31.

In the FB reading mode, the FB side transmission gear (example of a carriage gear) 21 transmits the power from the motor 31 to the carriage 8. On the other hand, in the ADF reading mode, the ADF side transmission gear (example of a conveyance gear) 23 transmits the power from the motor 31 to the conveyance unit 44.

The planetary gear 17 switches its position as follows. That is, in the ADF reading mode, the planetary gear 17 is meshingly engaged with the ADF side transmission gear 23 at a conveyance position (hereinafter, referred to as "ADF position") so as to connect the sun gear 15 with the ADF side transmission gear 23 in FIG. 5; while, in the FB reading mode, the planetary gear 17 is meshingly engaged with the FB side transmission gear 21 at a carriage position (hereinafter, referred to as "FB position") so as to connect the sun gear 15 with the FB side transmission gear 21 in FIG. 4. Further, the planetary gear 17 can rotate about a center thereof while being engaged with the sun gear 15 and revolve between the FB position illustrated in FIG. 4 and the ADF position illustrated in FIG. 5 about the sun gear 15 as a revolution center.

When the sun gear 15 rotates, the planetary gear 17 is applied with a rotation force for rotating the planetary gear 17 and a revolution force for revolving the planetary gear 17. Thus, when the sun gear 15 rotates in the normal direction (clockwise direction in FIG. 4), the planetary gear 17 is applied with a revolution force directed from the ADF position to FB the position (i.e., clockwise direction in FIG. 4).

On the other hand, when the sun gear rotates in the reverse direction (counterclockwise direction in FIG. 4), the planetary gear 17 is applied with a revolution force directed from the FB position to ADF position (i.e., counterclockwise direction in FIG. 4). When the revolution force becomes larger, the planetary gear 17 revolves in the direction of the revolution force. While the revolution force is small, the planetary gear 17 rotates without the revolution.

When the sun gear 15 rotates in the normal direction, the planetary gear 17 rotates in a normal rotation direction. Similarly, when the sun gear 15 rotates in the reverse direction, the planetary gear 17 rotates in a reverse rotation direction. The normal rotation direction of the planetary gear 17 and the normal direction of the sun gear 15 are opposed to each other, and the reverse rotation direction of the planetary gear 17 and the reverse direction of the sun gear 15 are opposed to each other, respectively.

The planetary gear 17 is supported on an arm 18 so as to be rotatable and revolvable. The arm 18 has one end in an extending direction thereof rotatably supported coaxially on the sun gear 15 and the other end where the planetary gear 17 is rotatably assembled.

The document platen 3 has a second stopper 3H and a third stopper 3J each restricting excessive rotation of the arm 18. On the other hand, the arm 18 has a second contacted portion 18A in contact with the second stopper 3H and a third contacted portion 18B in contact with the third stopper 3J.

Figure 5:
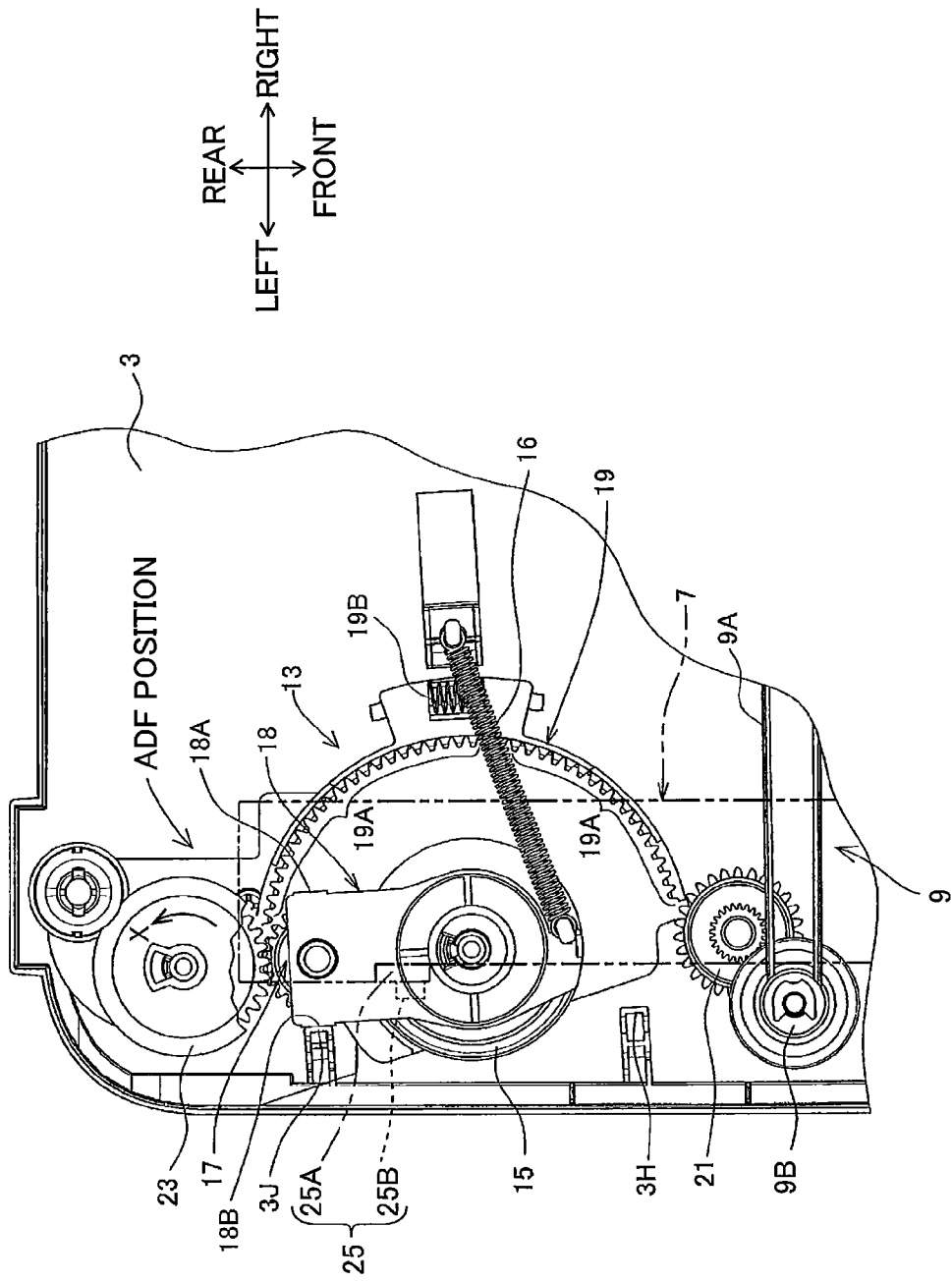
FIG. 5 is a schematic view of the drive transmission mechanism in a state where a planetary gear is positioned at a conveyance position to the preferred embodiment of the present invention.

As shown in FIG. 4, when the planetary gear 17 is positioned at the FB position, the second stopper 3H is in contact with the second contacted portion 18A to restrict further clockwise rotation of the arm 18. Further, as shown in FIG. 5, when the planetary gear 17 is positioned at the ADF position, the third stopper 3J is in contact with the third contacted portion 18B to restrict further counterclockwise rotation of the arm 18.

A first spring 16 is provided for urging the arm 18 so as to prevent the revolving of the planetary gear 17 when the planetary gear 17 is positioned at the FB position or the ADF position. More specifically, in the FB reading mode, the first spring 16 prevents the planetary gear 17 from being separated from the FB side transmission gear 21 while the sun gear 15 rotates in the reverse direction. That is, the first spring 16 applies to the planetary gear 17 a first inhibiting force preventing the planetary gear 17 from revolving toward the ADF position at least when the planetary gear 17 is positioned at the FB position.

The first spring 16 used in the present embodiment is an extension coil spring. The first spring 16 has a one end in an extension direction thereof connected to one side of the arm 18 opposite to the planetary gear 17 with respect to a swing center of the arm 18 and the other end connected to the document platen 3.

Thus, the first spring 16 applies to the arm 18 a second inhibiting force preventing the planetary gear 17 from revolving toward the FB position when the planetary gear 17 is positioned at the ADF position.

As described later, in a state where the planetary gear 17 is positioned at the ADF position, a drive force is transmitted to the conveyance unit 44, and the sun gear 15 is rotating in the reverse direction. While the sun gear 15 rotates in the reverse direction, the planetary gear 17 is applied with a force for revolving from the FB position to the ADF position.

Thus, in the present embodiment, even if the second inhibiting force is absent, the planetary gear 17 stays at the ADF position at least while the drive force is transmitted to the conveyance unit 44, that is, while the sun gear 15 rotates in the reverse direction.

In view of the above, in the present embodiment, the first inhibiting force for preventing the revolution of the planetary gear 17 at the FB position due is made larger than the second inhibiting force for preventing the revolution of the planetary gear 17 at the ADF position.

Specifically, the one end and the other end each of the first spring 16 are located such that a deformation amount of the first spring 16 when the planetary gear 17 is positioned at the FB position (FIG. 4) is larger than that of the first spring 16 when the planetary gear 17 is positioned at the ADF position (FIG. 5).

The engagement portion 19 is meshingly engaged with the planetary gear 17 while the planetary gear 17 revolves between the FB position and the ADF position. In the present embodiment, the engagement portion 19 is constituted by an internally-toothed gear.

As shown in FIG. 4, the engagement portion 19 is provided with a plurality of projections 19A projecting toward the sun gear 15, and the projections 19A are arranged along a revolution path of the planetary gear 17.

The engagement portion 19 is assembled to the document platen 3 so as to be movable relative to the sun gear 15. Specifically, in the present embodiment, the engagement portion 19 is movable along the revolution path of the planetary gear 17 about the sun gear 15. A second spring 19B for urging the engagement portion 19 to an original position thereof is provided.

The ADF side transmission gear 23 is provided on the hinge mechanism 5A side relative to the FB side transmission gear 21 in a direction parallel to the placement surface 3A and perpendicular to the moving direction of the reading unit 7 (i.e., front-to-rear direction in the present embodiment). Further, the ADF side transmission gear 23 is a gear rotating only in one direction. Thus, the ADF side transmission gear 23 has a mechanism that allows rotation in an X-direction (counterclockwise direction in FIG. 5) by which the conveyance unit 44 conveys the document and prevents rotation in a direction reverse to the X-direction. For example, as the mechanism for preventing the reverse rotation, a known reverse rotation preventing claw (not shown) can be employed.

That is, as shown in FIG. 4, the FB side transmission gear 21 is provided at a position opposed to the ADF side transmission gear 23 with respect to the sun gear 15. The sun gear 15, the planetary gear 17, the FB side transmission gear 21, and the ADF side transmission gear 23 respectively have a rotational axis orthogonal to the placement surface 3A.

Further, as shown in FIG. 4, the FB side transmission gear 21 is meshingly engaged with the planetary gear 17 when the planetary gear 17 is positioned at the FB position. Thus, when the planetary gear 17 is positioned at the FB position, the drive power is transmitted from the sun gear 15 to the FB side transmission gear 21 through the planetary gear 17. Then, the FB side transmission gear 21 drives the first toothed pulley 9B to thereby activate the moving mechanism 9.

When the sun gear 15 rotates in the normal direction, the moving mechanism 9 moves the carriage 8, i.e., the reading unit 7 in the direction of the arrow A of FIG. 3, while when the sun gear 15 rotates in the reverse direction, the moving mechanism 9 moves the carriage 8, i.e., the reading unit 7 in the direction of the arrow B of FIG. 3. That is, the moving direction of the reading unit 7 is determined depending on the rotational direction of the sun gear 15.

As shown in FIG. 5, the ADF side transmission gear 23 is meshingly engaged with the planetary gear 17 when the planetary gear 17 is positioned at the ADF position. Thus, when the planetary gear 17 is positioned at the ADF position, the drive power is transmitted from the sun gear 15, through the planetary gear 17, to the ADF side transmission gear 23 to thereby activate the conveyance unit 44.

As shown in FIG. 2 and the like, the load generation unit 25 is provided for increasing a rotational resistance of the FB side transmission gear 21. The load generation unit 25 increases the rotational resistance of the FB side transmission gear 21 when the carriage 8, i.e., the reading unit 7 is positioned at the ADF reading position RP as compared to that when the reading unit 7 is at a position other than the ADF reading position RP.

That is, in the present embodiment, the load generation unit 25 includes the first contacted portions 25A provided in the reading unit 7 and the first stoppers 25B provided in the document platen 3. The first contacted portions 25A and the first stoppers 25B contact each other, as shown in FIG. 4.

Thus, when the reading unit 7 is positioned at the ADF reading position RP while the sun gear 15 rotates in the reverse direction to bring the first contacted portions 25A and the first stoppers 25B into contact with each other, the movement of the reading unit 7 is restricted, which increases the rotational resistance of the FB side transmission gear 21.

Further, as shown in FIG. 2 and the like, each the first stoppers 25B (example of a restricting member) of the load generation unit 25 is positioned at an end position in a range within which the carriage 8 is movable in a predetermined direction (right-to-left direction) and restricts the movement of the carriage 8 when the position of the planetary gear 17 is switched from the FB position to the ADF position.

3. Operation of Drive Power Transmission Mechanism 3-1. FB Reading Mode

When the image reading apparatus 1 is in an inactive state, the reading unit 7 is positioned at the waiting position WP, and the planetary gear 17 is positioned at the FB position. When a user pushes the read start key 11A to start the FB reading, a CPU 20 described later rotates the motor 31 in the normal direction to rotate the sun gear 15 in the normal direction.

As a result, the reading unit 7 is moved from the waiting position WP toward the read end position PE. At this time, the planetary gear 17 is applied with the revolution force directed from the ADF position to the FB position.

However, the second stopper 3H and the second contacted portion 18A contact with each other, and thus the planetary gear 17 rotates in the normal direction while staying at the FB position without revolution.

Then, the CPU 20 (see FIG. 6) rotates the motor 31 in the reverse direction when, for example, the number of drive steps of the motor 31 reaches a predetermined value to rotate the sun gear 15 in the reverse direction. Further, the CPU 20 stops the motor 31 when the reading unit 7 reaches the waiting position WP. As a result, the reading unit 7 is moved from the read end position RE to the waiting position WP.

While the sun gear 15 rotates in the reverse direction, the planetary gear 17 is applied with the revolution force directed from the FB position to the ADF position, that is, the revolution force in a direction away from the FB side transmission gear 21. However, the above revolution force is canceled by the first spring 16, so that the planetary gear 17 rotates in the reverse direction while staying at the FB position without revolution.

3-2. ADF Reading Mode

When the image reading apparatus 1 is in an inactive state, the reading unit 7 is positioned at the waiting position WP, and the planetary gear 17 is positioned at the FB position. When a user pushes the read start key 11A to start the ADF reading, the CPU 20 rotates the motor 31 in the reverse direction to rotate the sun gear 15 in the reverse direction.

As a result, the reading unit 7, i.e., the carriage 8, is moved from the waiting position WP to the ADF reading position RP. Then, when the reading unit 7 reaches the ADF reading position RP to bring the first stoppers 25B and the first contacted portions 25A into contact with each other, the movement of the reading unit 7 is restricted to increase the rotational resistance of the FB side transmission gear 21.

As the rotational resistance of the FB side transmission gear 12 increases, the rotation force of the planetary gear 17 is reduced and the revolution force of the planetary gear 17 to revolve from the FB position to the ADF position is increased. Then, when the revolution force exceeds the first inhibiting force of the first spring 16, the planetary gear 17 is brought into engagement with the engagement portion 19, whereby the planetary gear 17 starts to revolve toward the ADF position.

When the planetary gear 17 revolves to bring the third stopper 3J and the third contacted portion 18B into contact with each other, the revolution of the planetary gear 17 is stopped, and then the planetary gear 17 is brought into engagement with the ADF side transmission gear 23. Thus, drive power is transmitted to the conveyance unit 44, whereby conveyance of the document is started.

When the ADF reading is ended, the CPU 20 rotates the motor 31 in the normal direction. As a result, the planetary gear 17 is applied with the revolution force directed from the ADF position to the FB position.

Then, the revolution force exceeds the second inhibiting force of the first spring 16, the planetary gear 17 revolves toward the FB position. When the planetary gear 17 is positioned at the FB position, the planetary gear 17 is brought into engagement with the FB side transmission gear 21, so that the reading unit 7 is moved in the direction of the arrow A of FIG. 2 from the ADF reading position RP.

4. Electrical Configuration of Image Reading Apparatus

Figure 6:
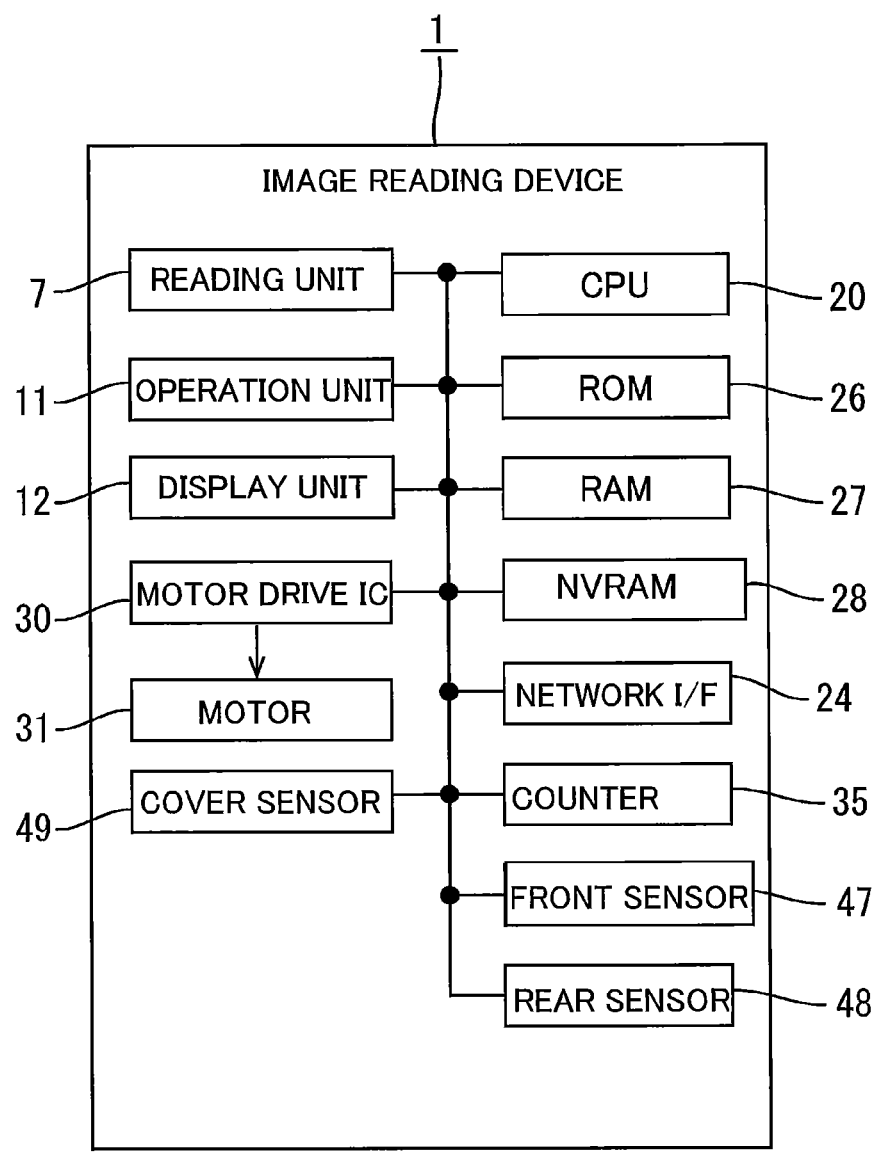
FIG. 6 is a block diagram illustrating an electric configuration of the image reading apparatus according to the preferred embodiment of the present invention.

As shown in FIG. 6, the image reading apparatus 1 includes the CPU (example of a control device) 20, a ROM 26, a RAM 27, an NVRAM (Non-Volatile RAM) 28, and a network interface (hereinafter, referred to as "network I/F") 24. The above components are connected with the reading unit 7, the operation unit 11, the display unit 12, a counter 35, the front sensor 47, the rear sensor 48, a cover sensor 49, and a motor drive IC 30. The motor drive IC 30 is connected with the motor 31.

The operation unit 11 receives an instruction inputted by a user such as power ON/OFF, setting of reading resolution, start of reading operation, or the like.

The network I/F 24 is connected to an external user computer (hereinafter, referred to as "user PC") through a communication line (not illustrated), allowing data communication to be performed between the image reading apparatus 1 and the user PC through the network I/F 24. The reading start instruction can be received from the user PC through the network I/F 24.

The ROM 26 stores therein various programs for controlling operation of the image reading apparatus 1, and the CPU 20 performs control for each unit of the image reading apparatus 1 according to a program read from the ROM 26 while storing a processing result of the program in the RAM 27 or NVRAM 28. For example, the ROM 26 stores therein the number of steps for step-driving the motor 31. The NVRAM (example of a storing unit) 28 stores therein data for initializing the reading unit 7 which is acquired upon execution of acquisition process to be described later.

The motor 31 is a stepping motor. The motor drive IC 30 controls drive of the motor 31 under control of the CPU 20. The counter 35 counts the number of steps to control the motor 31. The cover sensor 49 detects an open state of the document cover 5.

The CPU 20 controls the motor drive IC 30 to control a torque and a rotation direction of the motor 31. A motor drive current and a motor torque have a proportional relationship, and thus increasing the drive current causes the motor torque to increase. Alternatively, the motor drive speed and the motor torque have an inverse relationship, and thus reducing the drive speed causes the motor torque to increase.

5. Pre-reading Process

The following describes examples concerning pre-reading process to be performed in the image reading apparatus 1 with reference to FIGS. 7 to 10. In the present embodiment, the CPU 20 executes the pre-reading process according to a program stored in the ROM 26 when, for example, a user sets a document on the document tray 42 and pushes the read start key 11A to instruct the image reading apparatus 1 to perform reading operation in the ADF reading mode. After the completion of the pre-reading process, the normal ADF reading of the ADF 40 (reading process) is performed.

5-1. Embodiment 1

Figure 7:
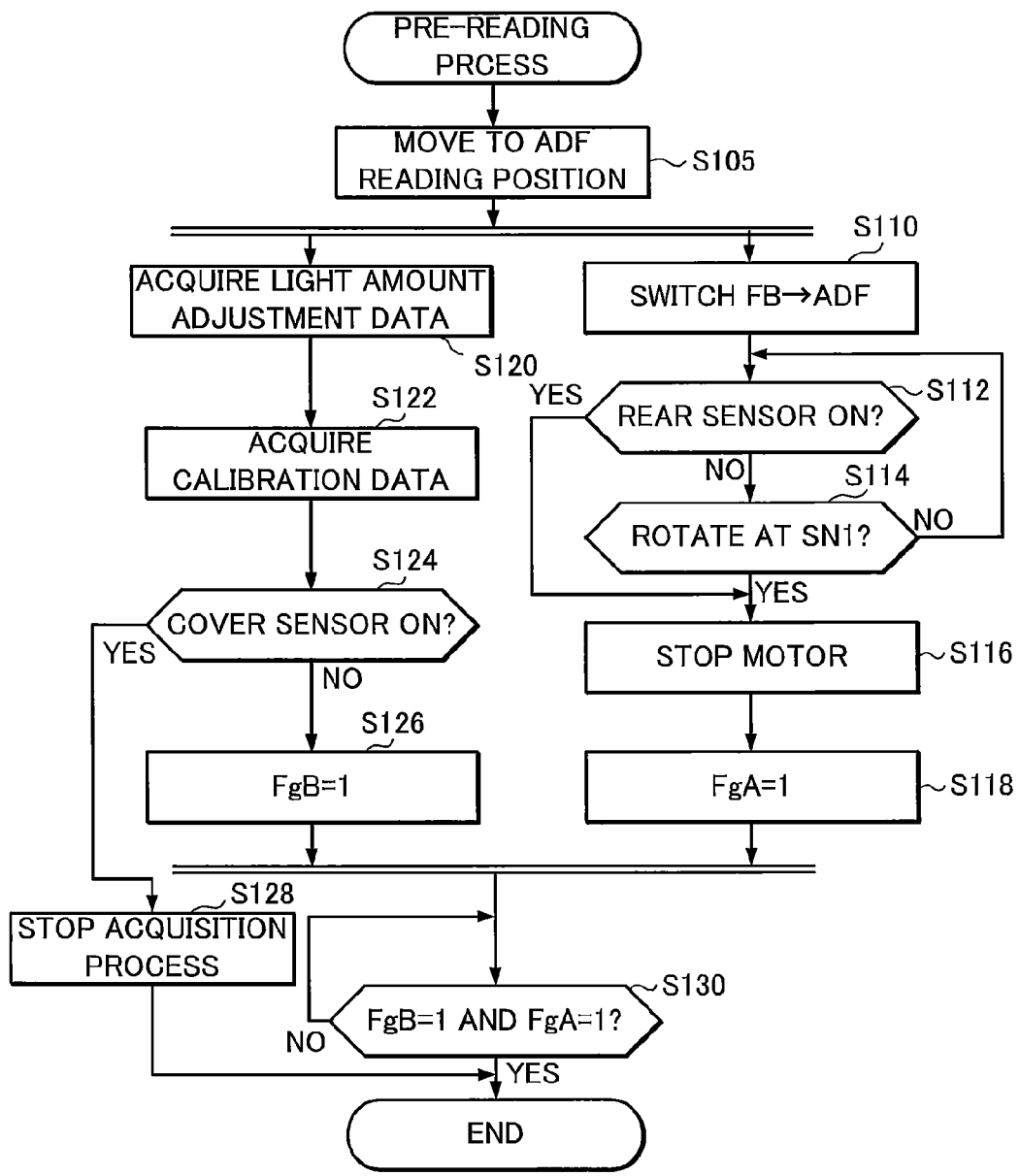
FIG. 7 is a flowchart illustrating a pre-reading process of the image reading apparatus according to a first embodiment of the present invention.

In the pre-reading process of embodiment 1 shown in FIG. 7, the CPU 20 controls the motor 31 to rotate in the reverse direction to move the carriage 8, i.e., the reading unit 7, from the waiting position WP toward the ADF reading position RP (S105; moving process).

Then, the CPU 20 controls the motor 31 to further rotate in the reverse direction to start a switching process for switching a position of the planetary gear 17 from the FB position to the ADF position (S110). In the switching process, the arms 18 is exerted on a reaction force from the FB side transmission gear 21 which is generated by the rotation of the planetary gear 17 according to the rotation of the sun gear 15 in the reverse direction. The reaction force needs to be larger than the inhibiting force of the first spring 16 inhibiting the revolution of the planetary gear 17. Thus, the motor torque in the switching process is previously determined by experiments such that the reaction force from the FB side transmission gear 21 is larger than the inhibiting force of the first spring 16 inhibiting the revolution of the planetary gear 17.

The reaction force from the FB side transmission gear 21 is caused by the rotational resistance of the FB side transmission gear 21 due to the load generation unit 25. That is, in this state, the FB side transmission gear 21 hardly rotates by the load generation unit 25, so that the planetary gear 17 receives, upon start of the rotation thereof, the reaction force acting in a direction substantially opposite to a direction of the rotation thereof from the FB side transmission gear 21.

As described above, utilizing the reaction force from the FB side transmission gear 21 whose rotation is suppressed to the planetary gear 17 in the switching process, the position of the planetary gear 17 can appropriately be switched from the FB position to the ADF position without loss of synchronization of the planetary gear 17 with the motor 31.

During the switching process, the CPU 20 determines, based on a detection signal from the rear sensor 48, whether or not the rear sensor 48 detects the document and is turned ON (S112). If the rear sensor 48 is tuned ON (S112:YES), the CPU 20 controls the motor 31 to stop its rotation (S116). If the rear sensor 48 detects the document and is turned ON, the document on the document tray 42 may be drawn into the conveyance path 4 and reach the ADF reading position RP because the position of the planetary gear 17 has been switched to the ADF position. To prevent this, if the rear sensor 48 detects the document during the switching operation, the CPU 20 controls the motor 31 to stop its rotation, thereby preventing an acquisition process described later at the ADF reading position RP from being interrupted by the document.

On the other hand, if the rear sensor 48 does not turned ON (S112:NO), the CPU 20 determines, based on a count value of the counter 35, whether or not the motor 31 has rotated at a predetermined number SN1 of steps (S114). If the motor 31 has rotated at a predetermined number SN1 of steps (S114: YES), the CPU 20 determines that the switching process is ended and controls the motor to stop its rotation (S116). Subsequently, the CPU 20 sets a switching process end flag FgA to "1" (S118).

On the other hand, if the motor 31 has not yet rotated a predetermined number SN1 of steps (S114:NO), the CPU 20 determines that the switching operation is not ended and the routine returns to S112. The predetermined number SN1 of steps is previously determined by experiments and stored in the ROM 26 as the number of steps required to move the carriage 8 from the waiting position WP to the ADF reading position RP and to switch the position of the planetary gear 17 from the FB position to the ADF position.

In the present embodiment, the CPU 20 performs, in parallel to the switching process, the acquisition process for acquiring the initialization data. That is, the CPU 20 starts the switching process in S110 and, at the same time, controls the light source 7A of the reading unit 7 to emit light toward the white reference board 46A at a position where the reading unit 7 faces the second reading window 3C to acquire, as the initialization data, light amount adjustment data for adjusting a light emission amount of the light source 7A (S120; adjustment data acquisition process).

More in detail, in the acquisition of the light amount adjustment data, the CPU 20 controls the light source 7A to emit light in a light emission amount exceeding a reference light receiving amount of the linear sensor 7C and gradually reduces the light emission amount. Then, the CPU 20 detects, in any one of the light receiving elements constituting the linear image sensor 7C, a light emission amount when the maximum value of the light receiving amount of light reflected from the white reference board 46A reaches the reference light receiving amount and then acquires the detected light emission amount as the light amount adjustment data.

Subsequently, the CPU 20 controls the light source 7A to emit the light whose emission amount has been adjusted by the light amount adjustment data toward the white reference board 46A at the position in confrontation with the second reading window 3C and acquires, as initialization data, calibration data for correcting read data acquired through the reading process (S122; calibration data acquisition process). The CPU 20 acquires the calibration data for each of the light receiving elements constituting the linear image sensor 7C and utilizes the acquired calibration data for, e.g., shading correction in the reading process.

Subsequently, the CPU 20 determines, based on a detection signal from the cover sensor 49, whether or not the document cover 5 is in the open state during the acquisition of the light amount adjustment data and the calibration data (S124). If the cover sensor 49 detects the open state of the document cover 5 (S124:YES), the CPU 20 stops the adjustment data acquisition process or the calibration data acquisition process, i.e., acquisition of the light amount adjustment data or the calibration data (S128), and at the same time stops the switching process and controls the motor 31 to return the carriage 8 to the waiting position WP, whereby the pre-reading process is once ended. In this case, the display unit 12 may display information indicating the failure of the pre-reading process as error notification to the user.

In a state where the document cover 5 is opened, adequate acquisition process cannot be performed due to influence of outside light, which may prevent the acquisition of the initialization data. For this reason, if the cover 5 is open, the acquisition process is preferably stopped as in this Embodiment 1.

On the other hand, if the cover sensor 49 does not detect the open state of the document cover 5 during the acquisition of the light amount adjustment data and the calibration data (S124:NO), the CPU 20 determines that the acquisition process is ended and sets an acquisition process end flag FgB to "1" (S126). If the detection signal of the cover sensor 49 indicating the open state is input to the CPU 20 during the acquisition of the light amount adjustment data (S120) or the calibration data (S122), the CPU 20 halts the acquisition process as an interrupt process.

Subsequently, the CPU 20 determines whether or not the acquisition process end flag FgB is "1" and the switching process end flag FgA is "1" (S130). If the acquisition process end flag FgB is "1" and the switching process end flag FgA is "1" (S130:YES), the CPU ends the pre-reading process of this embodiment 1. If at least one of the acquisition process end flag FgB and the switching process end flag FgA are not "1" (S130:NO), the CPU 20 waits until both the flags FgB and FgA become "1".

In the embodiment 1, the moving process of S105 need not necessarily be performed. For example, if the initial waiting position is the ADF reading position RP, the moving process of S105 may be omitted.

Further, the process of S112 and S124 also need not necessarily be performed, and at least one of the process may be omitted. That is, one or both of the process of S112 and S124 may be omitted.

Effect of Embodiment 1

As described above, the acquisition process (S120 and S122) for acquiring the initialization data for initialize the reading unit 7 is executed during the switching process (S110) for switching the position of the planetary gear 17 from the FB position to the ADF position. By executing the acquisition process during the switching process, a start-up time required to start the reading process can be reduced by a time required for the acquisition process, as compared to a case where the switching process is performed after the acquisition process is ended. That is, in a configuration in which the position of the planetary gear 17 is switched between the ADF position and the FB position, a start-up time required to start the reading process can be reduced even if the acquisition process for acquiring the initialization data is performed.

Further, when the position of the planetary gear 17 is switched from the FB position to the ADF position, the CPU 20 executes the acquisition process with the reading unit 7 positioned at the ADF reading position RP where the ADF reading is performed and retained by the carriage 8 whose movement is restricted by the first stoppers 25B of the load generation unit 25. In this case, the movement of the carriage 8 is restricted by the first stoppers 25B, so that even if the completion of the acquisition process takes a long time, the carriage 8 stays at the ADF reading position RP. Thus, the reading unit 7 can reliably execute the acquisition process at the ADF reading position RP.

Further, the second reading window 3C is provided at the ADF reading position RP so as to face the reading unit 7, and the white reference board 46A is provided at the ADF reading position RP so as to face the reading unit 7 through the second reading window 3C. Thus, the acquisition process of the light amount adjustment data and the calibration data can be executed by using the white reference board 46A.

Further, the moving process in which the carriage 8 moves to the ADF reading position RP is executed before the switching process. Thus, the carriage 8 is moved to the ADF reading position RP before disengagement between the planetary gear 17 and the FB side transmission gear 21 so as to execute the initialization process, thereby executing the ADF reading appropriately without executing the switching process a number of times.

The acquisition process may be executed in parallel not only to the switching process for switching the position of the planetary gear 17 from the FB position to the ADF position, but also to the switching process for switching the position of the planetary gear 17 from the ADF position to FB position. However, in the case where the position of the planetary gear 17 is switched from the ADF position to the FB position, the movement of the carriage 8 is not restricted by the first stoppers 25B and the drive power from the planetary gear 17 is transmitted to the FB side transmission gear 21 during the acquisition process, which may cause the carriage 8 to move from the ADF reading position RP. Thus, the acquisition process may be affected by noise or prevent the acquisition process from being adequately executed, which may in turn prevent the reading unit 7 from reliably executing the acquisition process at the ADF reading position RP. Therefore, as in the present embodiment, the acquisition process is preferably executed in parallel to the switching process that switches the position of the planetary gear 17 from the FB position to the ADF position.

5-2. Embodiment 2

Figure 8:
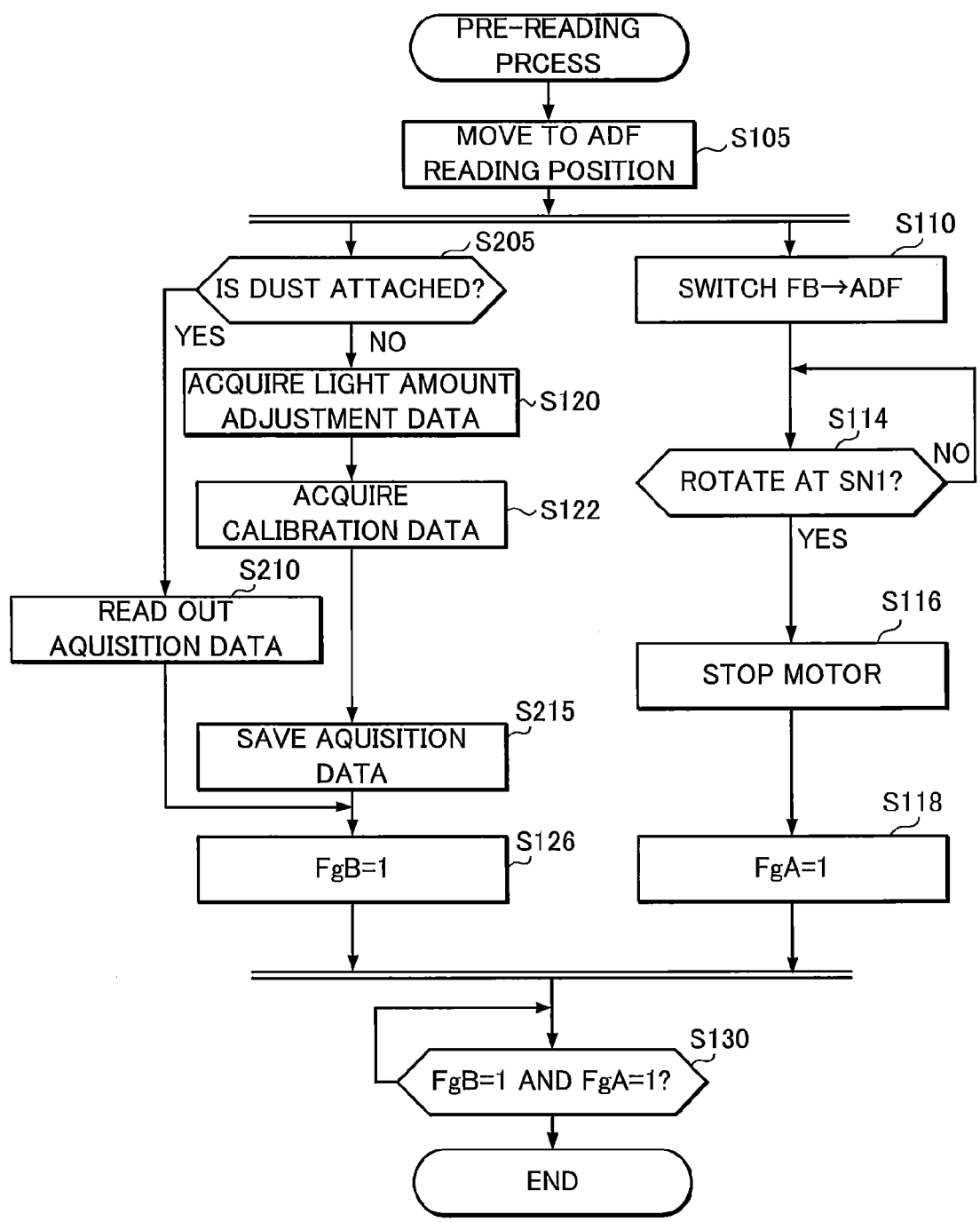
FIG. 8 is a flowchart illustrating a pre-reading process of an image reading apparatus according to a second embodiment of the present invention.
Figure 9:
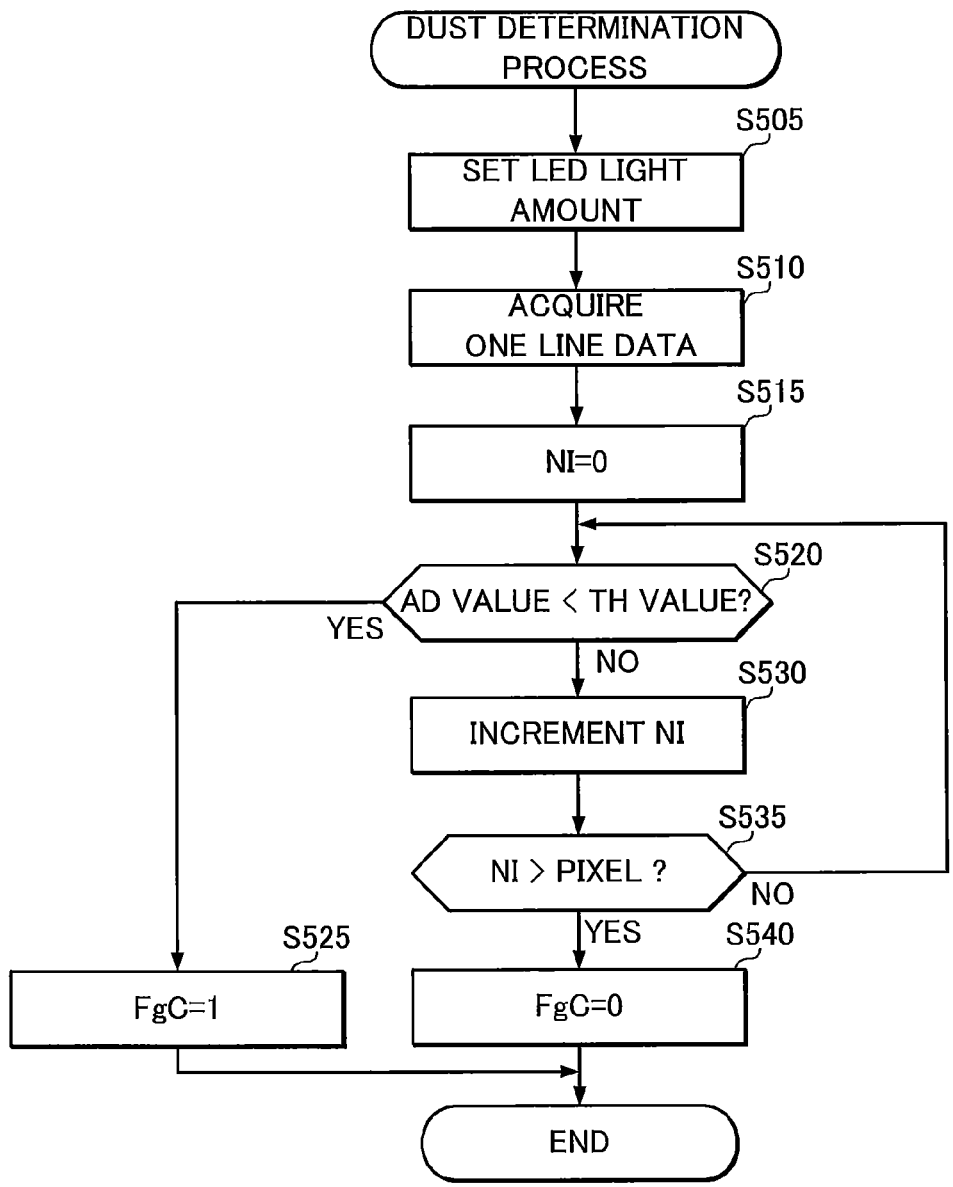
FIG. 9 is a flowchart illustrating a dust determination process according to the second embodiment of the present invention.

The following describes embodiment 2 of the pre-reading process with reference to FIGS. 8 and 9. Embodiment 2 differs from embodiment 1 whether or not dust presence on the ADF reading position RP is determined in the acquisition process. Thus, the same step numbers are assigned to the same process as the embodiment 1, and the descriptions thereof are omitted.

As shown in FIG. 8, the CPU 20 determines if dust is present at the ADF reading position RP before starting the acquisition process in parallel to the switching process (S205). Specifically, the CPU 20 determines whether or not dust is attached to the second reading window 3C or the white reference board 46A in a dust determination process described later. If the dust is present at the ADF reading position RP (S205:YES), the CPU 20 reads out from the NVRAM 28 the initialization data acquired as the light amount adjustment data and the calibration data each acquired in the previous acquisition process and then utilizes the read initialization data as current light amount adjustment data and current calibration data of this routine (S210).

On the other hand, if the dust is not present at the ADF reading position RP (S205:NO), the CPU 20 stores in the NVRAM 28 the light amount adjustment data and the calibration data acquired in the acquisition process of S120 and S122 (S215).

As described above, in the embodiment 2, if the dust is present at the ADF reading position RP, the CPU 20 reads out the initialization data stored in the NVRAM 28 instead of the acquisition process of this routine.

The dust determination process of S205 for determining whether or not the dust is attached will be described in detail with reference to FIG. 9. That is, the CPU 20 sets a light amount of LEDs of the reading unit 7 to a predetermined value (S505) and controls the LEDs to emit light toward the white reference board 46A in a predetermined light amount to acquire data of one line (S510). Subsequently, the CPU 20 sets a pixel number NI corresponding to the light receiving amount obtained by the light receiving element to "0" (S515) and determines whether or not an AD value (analog-digital conversion value) of the light receiving amount of an NI-th pixel is less than a TH value (dust determination threshold value) (S520).

If the AD value (analog-digital conversion value) of the light receiving amount of the NI-th pixel is less than the dust determination threshold value (S520:YES), the CPU 20 determines that the dust is attached to the second reading window 3C or the white reference board 46A since the light receiving amount is less than a specified value and sets a dust flag FgC to "1" (S525).

On the other hand, if the AD value of the light receiving amount of the NI-th pixel is not less than the dust determination threshold value (S520:NO), the CPU 20 increments the pixel number NI by a predetermined amount (S530) and determines whether or not the pixel number NI is more than the total number of pixels (S535). If the pixel number NI is not more than the total number of pixels (S535:NO), the CPU 20 returns to S520. If the pixel number NI is more than the total number of pixels (S535:YES), the CPU 20 sets the dust flag FgC to "0" (S540) to end the dust determination process.

Effect of Embodiment 2

If the dust is present at the ADF reading position RP, that is, if the dust is attached to the second reading window 3C or the white reference board 46A, error may be included in the initialization data to adversely affect the reading process. In order to prevent this, if the presence of the dust at the ADF reading position RP is determined, the previous initialization data stored in a storage unit such as the NVRAM 28 is used as the current initialization data of this routine. This can prevent the reading process from being adversely affected due to the presence of the dust even if the dust is present at the ADF reading position RP.

Preferably, at a shipping time of the image reading apparatus 1, predetermined initialization data is previously stored in a storage unit such as the NVRAM 28. This allows use of initialization data without an effect of the dust even if the dust is attached to the second reading window 3C or the white reference board 46A immediately after the shipping.

The process of S112 or S124 of embodiment 1 may be executed in embodiment 2.

5-3. Embodiment 3

Figure 10:
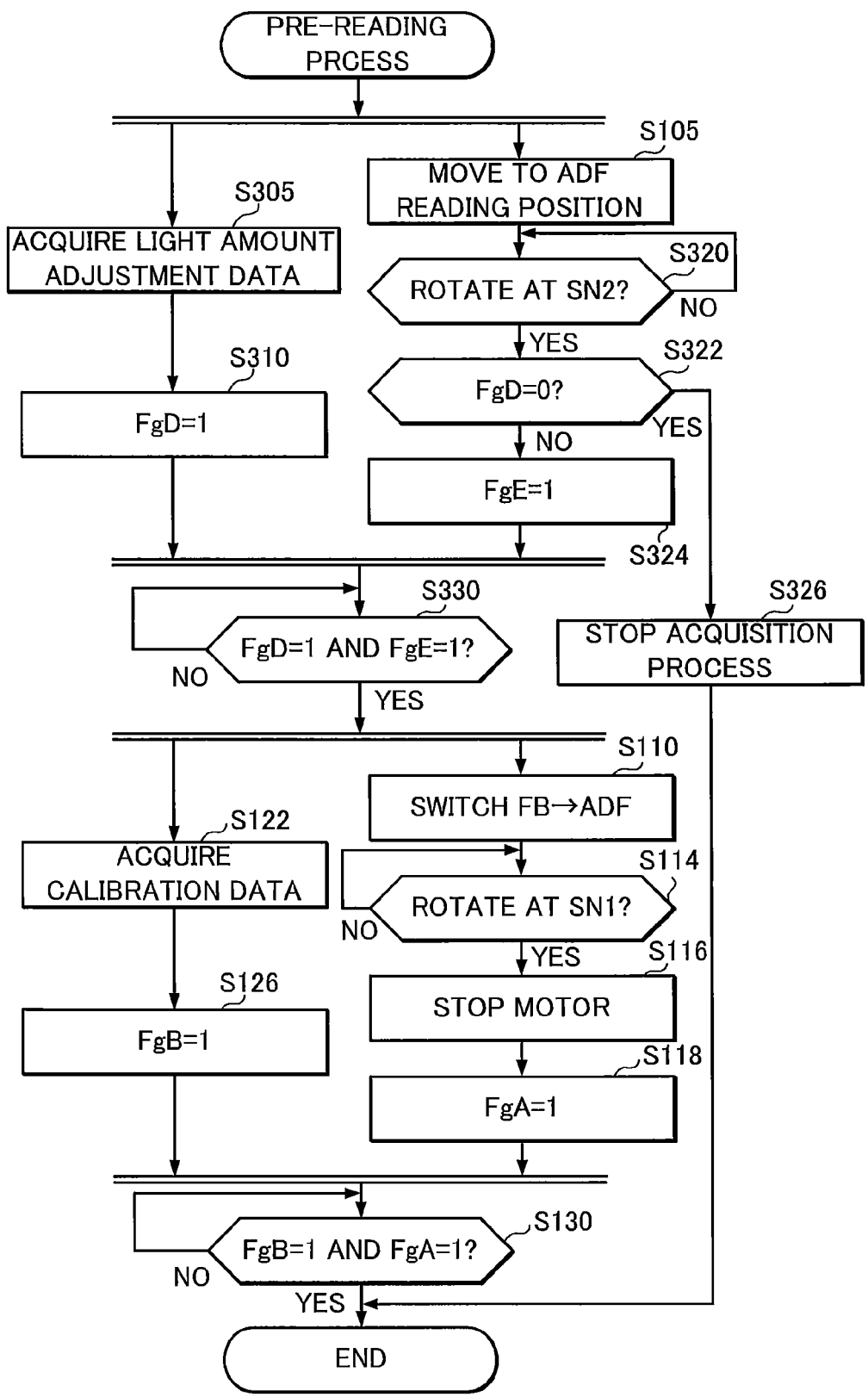
FIG. 10 is a flowchart illustrating a pre-reading process according to a third embodiment of the present invention.

The following describes embodiment 3 of the pre-reading process with reference to FIG. 10. Embodiment 3 differs from embodiment 1 in that the light amount adjustment data is acquired at a position facing the white tape 55A during the movement of the reading unit 7 from the waiting position WP to the ADF reading position RP. Thus, the same step numbers are assigned to the same process as embodiment 1, and the descriptions thereof are omitted.

As shown in FIG. 10, the CPU 20 controls the light source 7A of the reading unit 7 to emit light toward the white tape 55A at the position facing the white tape 55A during the movement of the carriage 8, i.e., reading unit 7 from the waiting position WR to the ADF reading position RP (S105), to thereby acquire, as the initialization data, the light amount adjustment data for adjusting the light emission amount of the light source 7A (S305; adjustment data acquisition process). Then, the CPU 20 sets an adjustment data end flag FgD to "1" (S310).

Further, during the moving process of the carriage 8, the CPU 20 determines, based on the count value of the counter 35, whether or not the motor 31 has rotated at a predetermined number SN2 of steps (S320). If the motor 31 has rotated at the predetermined number SN2 of steps (S320:YES), the CPU 20 determines whether or not the adjustment data acquisition end flag FgD is "0" (S322). That is, the CPU 20 determines whether or not the adjustment data acquisition process is completed before the carriage 8 reaches the edge BP of the second reading window 3C.

On the other hand, if the motor 31 has not yet rotated at the predetermined number SN2 of steps (S320:NO), the CPU 20 waits until the motor 31 has rotated at the predetermined number SN2 of steps. The predetermined number SN2 of steps is previously determined by experiments and stored in the ROM 26 as the number of steps required to move the carriage 8 from the waiting position WP to the edge BP of the second reading window 3C.

If the adjustment data end flag FgD is "0" (S322:YES), the CPU 20 determines that the adjustment data acquisition process is not ended before the carriage 8 reaches the edge BP of the second reading window 3C and stops the acquisition process as in S128 (S326). At a time, the CPU 20 also stops the switching process and controls the motor 31 to return the carriage 8 to the waiting position WP, whereby the pre-reading process is once ended.

On the other hand, if the adjustment data end flag FgD is not "0", that is, if the adjustment data end flag FgD is "1" (S322:NO), the CPU 20 controls the motor 31 to further rotate by a predetermined number of steps to move the carriage 8 to the ADF reading position RP. Then, the CPU 20 sets an ADF reading position transfer flag FgE to "1" (S324).

Subsequently, the CPU 20 determines whether or not the adjustment data end flag FgD is "1" and the ADF reading position transfer flag FgE is "1" (S330). If at least one of the adjustment data end flag FgD and ADF reading position transfer flag FgE are not "1" (S330:NO), the CPU 20 waits until both the flags FgD and FgE become "1".

On the other hand, if the adjustment data end flag FgD is "1" and the ADF reading position transfer flag FgE is "1" (S330:YES), the CPU 20 executes the calibration data acquisition process of S122 in parallel to the switching process of the position of the planetary gear 17 of S122. Then, if the acquisition process end flag FgB is "1" and switching process end flag FgA is "1" (S130:YES), the CPU ends the pre-reading process of this embodiment 3.

Effect of Embodiment 3

In embodiment 3, the adjustment data acquisition process is performed in parallel to the moving process of the carriage 8, thereby advancing a start of the adjustment data acquisition process. As a result, only the calibration data needs to be acquired during the switching process. Thus, it can be expected that the adjustment data acquisition process is reliably ended before the end of the switching process.

If the carriage 8 passes through the edge BP of the second reading window 3C during the adjustment data acquisition process, error may be included in the acquired light amount adjustment data to adversely affect the reading process. For this reason, if excessive time is taken to acquire the light amount adjustment data and the carriage 8 passes over the edge BP of the second reading window 3C before the acquisition of the light amount adjustment data, the adjustment data acquisition process is preferably stopped as in embodiment 3.

Further, the white tape 55A is provided at the same side as a surface of the second reading window 3C that contacts the document, and dust, such as paper powder, from the document is less likely to be attached to a surface of the white tape 55A than to the surface of the second reading window 3C that contacts the document. Thus, the acquisition of the light amount adjustment data influenced by the dust is performed under adequate environment with the use of the white tape 55A, thereby increasing a reliability of the initialization data to be acquired based on the light source 7A whose light emission amount has been adjusted.

The process of S112 or S124 of embodiment 1 may be executed in embodiment 3.

Other Embodiments

While the invention has been described in detail with reference to the embodiments thereof, it would be apparent to those skilled in the art that various changes and modifications may be made therein without departing from the spirit of the invention.

(1) In the above embodiment, the light amount adjustment data and the calibration data are acquired as the initialization data for initializing the reading unit 7. However, the present invention is not limited to this configuration.

(2) In the above embodiment, the entire acquisition process is executed during the switching process. However, the present invention is not limited to this configuration. For example, the scope of the present invention includes a configuration that a part of the acquisition process is performed during the switching process.

(3) In the above embodiment, the sun gear 15 and the planetary gear 17 in the planetary gear mechanism are used as the motor side transmission gear and switching gear, respectively. However, the present invention is not limited to this configuration. A gear of a type other than the sun gear 15 may be employed as the motor side transmission gear. Further, another configuration that switches its position between the FB position that connects the motor side transmission gear and FB side transmission gear and ADF position that connects the motor side transmission gear and ADF side transmission gear may be used as the switching gear.

(4) In the above embodiment, the CPU 20 is used as an example of a control device. However, the present invention is not limited to this configuration. The controller may be constituted by a plurality of circuits including an ASIC or may be constituted by the CPU and other circuits.

What is claimed is:

1. An image reading apparatus comprising:
   a conveyance unit configured to convey a document;
   a reading unit configured to read an image on the document;
   a carriage configured to support the reading unit and to be movable in a prescribed direction, the reading unit being selectively operable in a first mode in which the image on the document is read while the document is conveyed by the conveyance unit, and a second mode in which the image on the document is read by moving the reading unit in the prescribed direction;
   a motor;
   a motor gear configured to transmit a drive power generated by the motor;
   a conveyance gear configured to transmit the drive power to the conveyance unit in the first mode;
   a carriage gear configured to transmit the drive power to the carriage in the second mode;

a switching gear configured to be placed in a first position, when the reading unit operates in the first mode, where the motor gear is connected to the conveyance gear via the switching gear, and be placed in a second position, when the reading unit operates in the second mode, where the motor gear is connected to the carriage gear via the switching gear;

a storing unit;

a control device; and a restricting member configured to restrict movements of the carriage when the control device controls the switching gear to move from the second position to the first position, wherein the carriage is further movable within a predetermined region having an end portion in the prescribed direction, the restricting member being located at the end portion, the carriage being positioned in the first mode at a third position where the restricting member restricts the movements of the carriage, wherein the control device is configured to:

store initialization data for initializing the reading unit in the storing unit;

control the switching gear to move between the first position and the second position;

determine whether the reading unit detects dust when the carriage is positioned at the third position;

in response to determining that the reading unit does not detect dust when the carriage is positioned at the third position, acquire the initialization data for initializing the reading unit while the control device controls the carriage to be positioned at the third position;

read the initialization data stored in the storing unit instead of acquiring initialization data in response to the reading unit detecting dust when the carriage is positioned at the third position; and control the reading unit to read the image on the document, wherein the control device acquires the initialization data while the control device controls the switching gear to move from the second position to the first position.

2. The image reading apparatus according to claim 1, further comprising:

a transparent member provided at a position facing the reading unit when the carriage is positioned at the third position; and a reading white board provided at a position opposed to the reading unit with the transparent member interposed therebetween when the carriage is positioned at the third position.

3. The image reading apparatus according to claim 2, wherein the reading unit includes a light source configured to emit light toward the document to read the image, wherein the control device is configured to control the carriage to move from a fourth position to the third position in a moving direction, the image reading apparatus further comprising a white board provided at a position upstream of the transparent member in the moving direction, wherein the control device is configured to:

acquire light amount adjustment data, as the initialization data, for adjusting a light amount of the light source by emitting the light toward the white board from the light source when the carriage faces the white board; and acquire calibration data, as the initialization data, for calibrating reading data by emitting the light adjusted by the light amount adjustment data toward the reading white board when the carriage faces the transparent member.

4. The image reading apparatus according to claim 3, wherein the transparent member has one side in contact with the document and another side opposed to the one side, and wherein the white board is provided at the same side as the other side.

5. The image reading apparatus according to claim 3, wherein the transparent member has an edge portion between the transparent member and the white board, wherein the control device is configured to determine whether the light amount adjustment data is acquired before the carriage has reached the edge portion while the control device controls the carriage to move from the fourth position to the third position, and wherein the control device stops an acquisition of the light amount adjustment data in response to a failure to acquire the light amount adjustment data before the carriage has reached the edge portion, the control device acquiring the calibration data when the light amount adjustment data is acquired before the carriage has reached the edge portion.

6. The image reading apparatus according to claim 1, further comprising a document sensor configured to detect the document conveyed to the conveyance unit and provided at a position upstream of the reading unit in a conveying path, wherein the control device is configured to stop the motor in response to a detection of the document by the document sensor.

7. The image reading apparatus according to claim 1, further comprising:

a cover configured to cover the carriage when the carriage is positioned at the third position; and a cover sensor configured to detect an open state of the cover, wherein the control device is configured to stop an acquisition of the initialization data in response to a detection of the open state.

8. The image reading apparatus according to claim 1, further comprising an engagement portion configured to be engaged with the switching gear when the switching gear is moved between the first position and the second position, wherein the control device acquires the initialization data while the switching gear is engaged with the engagement portion.

9. The image reading apparatus according to claim 1, wherein the restricting member is configured to increase a rotational resistance of the carriage gear to restrict movements of the carriage when the carriage is positioned at the third position, and wherein the switching gear begins to move from the second position to the first position due to an increase in the rotational resistance by the restricting member.

10. An image reading apparatus comprising:

a conveyance unit configured to convey a document;

a reading unit configured to read an image on the document;

a carriage configured to support the reading unit and to be movable in a prescribed direction, the reading unit being selectively operable in a first mode in which the image on the document is read while conveying the document by the conveyance unit, and a second mode in which the image on the document is read by moving the reading unit in the prescribed direction;

a motor;

a motor gear configured to transmit a drive power generated by the motor;

a conveyance gear configured to transmit the drive power to the conveyance unit in the first mode;

a carriage gear configured to transmit the drive power to the carriage in the second mode;

a switching gear configured to be placed in a first position, when the reading unit operates in the first mode, where the motor gear is connected to the conveyance gear via the switching gear, and be placed in a second position, when the reading unit operates in the second mode, where the motor gear is connected to the carriage gear via the switching gear;

a storing unit;

a control device; and a restricting member configured to restrict movements of the carriage when the control device controls the switching gear to move from the second position to the first position, wherein the carriage is further movable within a predetermined region having an end portion in the prescribed direction, the restricting member being located at the end portion, the carriage being positioned in the first mode at a third position where the restricting member restricts the movements of the carriage, wherein the control device is configured to:
  store initialization data in the storing unit;
  control the switching gear to move between the first position and the second position;
  determine whether the reading unit detects dust when the carriage is positioned at the third position;
  in response to determining that the reading unit does not detect dust when the carriage is positioned at the third position, acquire the initialization data initializing the reading unit;
  read the initialization data stored in the storing unit instead of acquiring initialization data in response to the reading unit detecting dust when the carriage is positioned at the third position; and
  control the reading unit to read the image on the document, wherein the control device acquires the initialization data when the switching gear has moved to and been positioned at the first position.

* * * * *